United States Patent
Salmon et al.

(10) Patent No.: US 7,503,149 B2
(45) Date of Patent: Mar. 17, 2009

(54) METHOD FOR MAKING A DOUBLE-WALLED THERMOSTRUCTURAL COMPOSITE MONOLITHIC COMPONENT AND RESULTING COMPONENT

(75) Inventors: Thierry Salmon, Bordeaux (FR); Georges Cahuzac, Le Bouscat (FR); Marc Bouchez, Bourges (FR); François Falempin, St. Arnoult en Yvelines (FR)

(73) Assignees: EADS Space Transpotation SA, Paris (FR); MBDA France, Paris (FR)

( * ) Notice: Subject to any disclaimer, the term of this patent is extended or adjusted under 35 U.S.C. 154(b) by 937 days.

(21) Appl. No.: 10/476,393

(22) PCT Filed: Feb. 27, 2003

(86) PCT No.: PCT/FR03/00628

§ 371 (c)(1),
(2), (4) Date: Oct. 31, 2003

(87) PCT Pub. No.: WO03/074260

PCT Pub. Date: Sep. 12, 2003

(65) Prior Publication Data

US 2004/0128946 A1 Jul. 8, 2004

(30) Foreign Application Priority Data

Mar. 4, 2002 (FR) .................................. 02 02684

(51) Int. Cl.
*B32B 3/06* (2006.01)
(52) U.S. Cl. ............................ 52/661; 428/102; 52/342

(58) Field of Classification Search ........... 52/342–343, 52/782.1, 746.1, 66–669; 428/102, 120, 428/318.4, 318.6, 317.9, 316.6, 104
See application file for complete search history.

(56) References Cited

U.S. PATENT DOCUMENTS

| | | | | |
|---|---|---|---|---|
| 2,692,219 | A | * | 10/1954 | Slayter et al. ................ 428/102 |
| 4,196,251 | A | * | 4/1980 | Windecker ............. 428/311.11 |
| 5,308,228 | A | * | 5/1994 | Benoit et al. ................ 416/230 |
| 5,390,707 | A | | 2/1995 | Cahuzac |
| 5,624,622 | A | * | 4/1997 | Boyce et al. ................ 264/258 |
| 5,759,321 | A | | 6/1998 | Cahuzac |
| 6,105,401 | A | | 8/2000 | Chadeyron et al. |
| 6,187,411 | B1 | * | 2/2001 | Palmer ....................... 428/102 |
| 6,495,227 | B1 | | 12/2002 | Cahuzac |

FOREIGN PATENT DOCUMENTS

| | | |
|---|---|---|
| DE | 9110061 | 4/1992 |
| DE | 10018035 | 10/2001 |
| FR | 2718670 | 10/1995 |

OTHER PUBLICATIONS

PCT International Search Report dated Jul. 30, 2003.

* cited by examiner

*Primary Examiner*—Jeanette Chapman
(74) *Attorney, Agent, or Firm*—Dickinson Wright, PLLC

(57) ABSTRACT

A method of producing a double-walled thermo-structural composite monolith may include assembling, by stitching, a sandwich having a core and outer fibrous armors. The stitched sandwich structure is impregnated with a viscous resin. After the resin hardens, the core is removed from the sandwich structure.

16 Claims, 3 Drawing Sheets

METHOD FOR MAKING A DOUBLE-WALLED THERMOSTRUCTURAL COMPOSITE MONOLITHIC COMPONENT AND RESULTING COMPONENT

FIELD OF THE INVENTION

The present invention relates to a thermostructural fiber/matrix composite monolith comprising two skins of composite material that are spaced apart and connected to each other by a plurality of filiform spacers of composite material, said monolith being capable of withstanding high internal and/or external pressures.

BACKGROUND OF THE RELATED ART

Such a composite monolith, intended for example to form panels able to convey a fluid, antiballistic shielding structures, thermal protection devices, supports for optical devices for space applications, or refractory radomes for high-resolution radars, etc., is disclosed in document FR-A-2 749 327. In that document, the fibrous structure of the composite monolith is obtained by knitting, those parts of said fibrous structure that correspond to said skins being formed by rows of knitted stitches, whereas the part of said fibrous structure that corresponds to said spacers is formed from oblique knitting threads that connect stitches of one of the skins to stitches of the other of said skins.

Thus, this fibrous structure is in the form of two panels, formed from stitches, separated from each other and connected to each other by a plurality of oblique linking threads. It will be noted that this arrangement is particularly favorable for impregnation by the resin intended to form the matrix of the composite monolith since said linking threads between the two panels are free and directly accessible to the resin. However, in such a structure, the two panels may move relative to each other because of the flexibility of said linking threads, which raises difficulties as regards the positioning of said structure in the impregnation mold and in respect of the desired dimensions for the composite monolith.

In addition, it should be pointed out that this known composite monolith has limited mechanical properties since, in said skins, the high-strength fibers constituting the structure are looped and therefore can work neither in tension nor in compression, nor even in bending, which is why they are advantageously used in composite materials. Likewise, the oblique linking threads cannot provide this known composite monolith with the optimum crushing and swelling resistance.

Moreover, a double-walled composite monolith with filiform spacers is mentioned, incidentally, in document FR-A-2 718 670 which, principally, discloses a composite monolith obtained in the following manner:

- a flexible fibrous reinforcement for each of said skins is applied to each of the opposed faces of a flexible core made of a material capable of being penetrated by a needle;
- said fibrous reinforcements and said core are assembled by stitching by means of a thread forming oblique stitches that include thread portions passing transversely through said fibrous reinforcements and said core;
- said sandwich structure is impregnated with the resin, which is intended to generate said matrix and which is then in the viscous state; and
- the curing of said resin impregnating said fibrous reinforcements is carried out.

This prior document also mentions that said core may, on the one hand, be made of a material impermeable to said resin, and, on the other hand, be removed after the resin curing operation, thereby allowing said composite monolith to be obtained.

However, there is no indication provided in document FR-A-2 718 670 as regards converting said transverse thread portions into filiform composite spacers. Now, the impregnation of said transverse thread portions cannot take place during impregnation of said fibrous reinforcements since, in this case, said transverse thread portions are isolated from the impregnation resin by said flexible core in which they are incorporated. To allow said transverse thread portions to be able to be impregnated with resin, in order to become composite rigid spacers, it is therefore necessary to assume that:

- either a further impregnation with resin and a further curing of the latter are carried out after removal of said core;
- or the stitching thread is preimpregnated with resin.

In the first case, the additional impregnation and curing must take place while the transverse thread portions are still flexible, which, as mentioned above in regard to document FR-A-2 749 327, entails difficulties in positioning one skin relative to the other and defects in the monolith.

In the second case, the resin impregnating the preimpregnated stitching thread rapidly fouls the stitching machine, to the point of completely preventing it operating.

In addition, since the stitches in the structure of the above document are oblique relative to the fibrous reinforcements, such a structure does not have the optimum crushing and swelling resistance, just like the structure of document FR-A-2 749 327.

SUMMARY OF THE INVENTION

The object of the present invention is to remedy these drawbacks. It makes it possible to produce said thermostructural monolith without additional impregnation and curing operations and without preimpregnation of the stitching thread, while still allowing the fibrous structure to be precisely positioned in the impregnation mold and optimum use of the mechanical properties of the fibers that constitute said skins.

For this purpose, according to the invention, the process for producing a thermostructural fiber/matrix composite monolith comprising two skins of composite material that are spaced apart and connected to each other by a plurality of filiform spacers of composite material, in which process:

a) a flexible sandwich structure, comprising an intermediate flexible core, made of a material capable of being penetrated by a needle and impermeable to the resin that has to generate said matrix, and two external flexible fibrous reinforcements, placed on opposed external faces of said flexible core respectively, is formed;

b) said fibrous reinforcements and said core of this sandwich structure are assembled by stitching by means of a thread forming stitches that include thread portions passing transversely through said fibrous reinforcements and said core;

c) said sandwich structure is impregnated with said resin in the viscous state;

d) the curing of said resin impregnating said sandwich structure is carried out; and e) said core is removed, is noteworthy:

in that said stitching thread is formed by a roving comprising a plurality of filaments that are not linked together;

in that, after the stitching operation specified at b), said thread portions passing transversely through said fibrous reinforcements and said core have, in the latter, longitudinal channels that are provided between said filaments and extend from one of said fibrous reinforcements to the other; and in that the impregnation operation specified at c) is carried out so that said curable resin is made to penetrate said longitudinal channels of said transverse thread portions in order to form, at the position of each of them, a resin bridge in contact via its opposed ends with the resin that impregnates said flexible fibrous reinforcements.

Thus, by virtue of the present invention, said transverse thread portions are impregnated with resin during impregnation of the fibrous reinforcements of said skins and, likewise, they are cured during the curing of said fibrous reinforcements, prior to removal of said core, in such a way that they become filiform spacers of composite material that are placed between said composite skins.

Such a result may be achieved by varying several parameters, preferably taken in combination, such as, for example:
 the diameter of the stitching needle that passes said thread through said fibrous reinforcements and said core;
 the nature of the constituent material of said core;
 the viscosity of the impregnation resin;
 the impregnation conditions; etc.

Excellent results have been achieved by choosing a needle matched to the number of filaments of the stitching thread and by making said core from a foam of a synthetic material, preferably a polystyrene, having a density of between 0.04 and 0.1, and preferably between 0.05 and 0.07. Thus, after impregnation and curing of said sandwich structure, filiform spacers are obtained that have a fiber content of between 30% and 90% and preferably between 30% and 50%.

Said impregnation operation is preferably carried out under reduced pressure—optionally in a vacuum—and, depending on the value of this reduced pressure, of the cross section of said longitudinal channels and on the length of said transverse thread portions, the viscosity of said impregnation resin is adapted experimentally, for example by dilution, so that it penetrates over the entire length of said transverse thread portions.

The sandwich structure may be assembled by stitching with or without knotting. In the first case (stitching with knotting), the ends of said transverse thread portions are firmly anchored into said fibrous reinforcements by bridges that connect two such consecutive portions. In the second case (stitching without knotting), there is formation, on one side of said sandwich structure, of projecting loops in such a way that, on this side, the anchoring of the ends of the transverse thread portions into the corresponding reinforcement results from the flattening of said loops whereas, on the other side of said sandwich structure, the ends of the transverse thread portions are anchored into the corresponding fibrous reinforcement by bridges that connect two consecutive portions.

The stitching thread and the fibrous reinforcements may be made of carbon or the like, while said resin is capable of generating carbon. Especially in this case, it is advantageous, after said resin curing operation, for the temperature of said sandwich structure to be raised so as to pyrolyze said resin, which then forms the carbon matrix of said composite monolith, and so that the removal of said core results from this temperature rise. This resin may be of phenolic type.

It should be pointed out that, by producing said sandwich structure by stitching, it is possible to give each of said reinforcements any fibrous organization best suited to the envisioned use for the composite monolith and to position, precisely and as a single piece, the fibrous structure in a mold for impregnation by the resin. Furthermore, said transverse thread portions are preferably orthogonal to said fibrous reinforcements so that the spacers are orthogonal to said skins and give the composite monolith the maximum crushing and swelling resistance.

BRIEF DESCRIPTION OF THE DRAWINGS

The figures of the appended drawing will make it clearly understood how the invention can be realized. In these figures, identical references denote similar elements.

DETAILED DESCRIPTION OF THE INVENTION

For the sake of clarity, in FIGS. 1C to 1E, 3, 4A to 4C, 5B and 6B, the two thread portions of each stitch are represented very far apart, but it goes without saying that, in reality, they are very close together.

Figure 1:
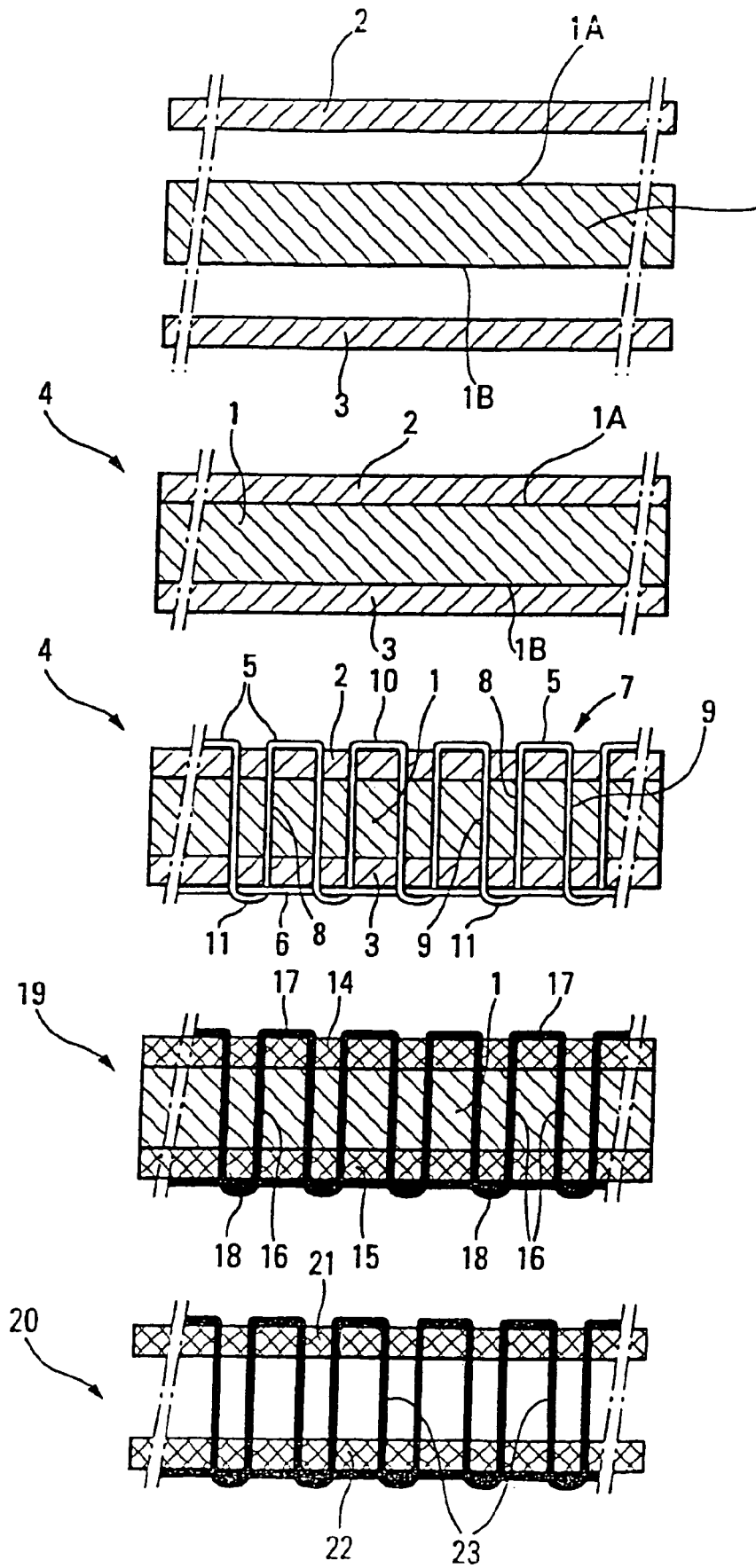
FIGS. 1A to 1E illustrate schematically five steps of the process according to the present invention.

FIG. 1A shows, in exploded schematic cross section, a flexible core 1 and two flexible fibrous reinforcements 2 and 3.

The flexible core 1, which is shown in the form of a sheet, may in reality be in any form having two opposed faces 1A and 1B, such as for example in the form of a cylinder, cone or prism. Said core is made of a material capable of being penetrated by a needle, such as for example a foam of a polyurethane, a polypropylene or preferably a polystyrene, having a density of between 0.04 and 0.1, preferably between 0.05 and 0.07. In addition, this material is impermeable to the resin that will be used later for impregnating the flexible fibrous reinforcements 2 and 3.

Each of the flexible fibrous reinforcements 2 and 3 has a fibrous structure that can be produced in any known manner, but is preferably of the types described in document U.S. Pat. Nos. 5,390,707, 5,759,321 or FR-A-2 753 993. Said reinforcements 2 and 3 are each in the form of a ply based on carbon or SiC fibers or else on any other material capable of forming high-strength fibers. These reinforcements may have different thicknesses.

As illustrated in FIG. 1B, the flexible reinforcements 2 and 3 are placed on opposed external faces 1A and 1B, respectively, of the flexible core 1 in such a way that a flexible sandwich structure 4 is obtained. It should be pointed out that, as is suggested by FIG. 1A, the flexible fibrous reinforcements 2 and 3 may be produced independently of the flexible core 1, in order thereafter to be attached to the faces 1A and 1B of said core. However, said reinforcements 2 and 3 may also be formed directly on said faces 1A and 1B of the core 1.

The elements 1, 2 and 3 of the sandwich structure 4 are assembled, one with the others, by stitching with knotting by means of a needle thread 5 and a shuttle thread 6 (see FIG. 1C). The needle thread 5 forms a plurality of parallel and/or crossed rows of stitches (not shown). Each stitch 7 comprises two thread portions 8 and 9, that pass transversely through the reinforcements 2 and 3 and the core 1, and a bridge 10 that connects said thread portions 8 and 9, and which stitch is connected to the previous stitch 7 and to the next stitch 7 by bridges 11 through which said shuttle thread 6 passes.

As shown in the figures, it is advantageous for the reinforcements 2 and 3 to be parallel to each other and for the transverse thread portions 8 and 9 to be orthogonal to said reinforcements.

Figure 2:
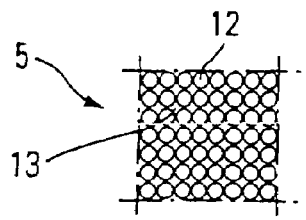
FIG. 2 is a partial, enlarged and schematic cross section of the stitching thread used in the process of the invention.
Figure 3:
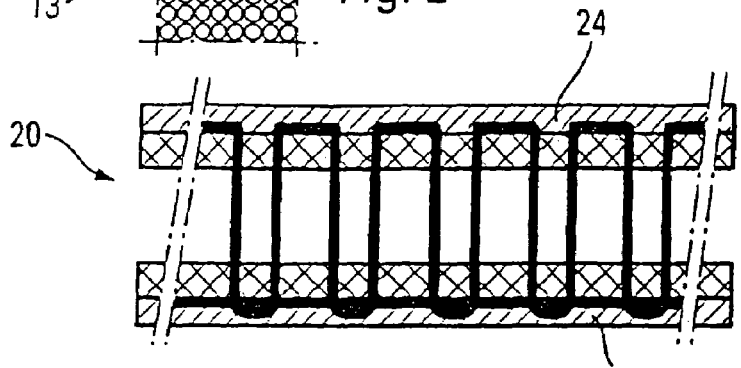
FIG. 3 shows, in schematic section, one embodiment of the monolith according to the present invention.

At least the needle thread 5, but preferably also the shuttle thread 6, is formed by a roving comprising a plurality of filaments 12 that are not linked together, which, even when they are pressed transversely against one another, leave between them longitudinal voids in such a way that each transverse thread portion 8, 9 includes a plurality of channels 13, of small cross section, between the filaments 12 that make up the thread (see FIG. 2). It goes without saying that, when said needle thread 5 is not pressed transversely, the channels 13 may have larger cross sections than those illustrated in FIG. 2. Each filament 12 may be made of carbon, SiC or any other material capable of forming high-strength fibers.

After stitching by the needle thread 5, said reinforcements 2 and 3 are therefore connected to each other via channels 13.

In an advantageous implementation example, to produce the stitching illustrated by FIG. 1C, a needle (not shown) having a diameter of about 2 mm and a needle thread 5 formed from at least 6000, but preferably 12000, carbon filaments 12, each having a diameter of about 5 micrometers, are used.

In should be pointed out that, at this stage of the process, the sandwich structure 4 assembled by the threads 5 and 6 is flexible and may optionally undergo shape modifications.

After stitching, the sandwich structure 4 is impregnated with a curable resin, this being of relatively low viscosity and possibly diluted, for example with alcohol. Such a resin may be of the phenolic type, epoxy type, cyanate-ester type, etc. The impregnation is preferably carried out under reduced pressure so that said resin penetrates not only into the fibrous reinforcements 2 and 3, but also into the longitudinal channels 13 of the threads 5 and 6.

In one example of implementation of the method according to the present invention, a phenolic resin, such as those known commercially by the name RA 101 (manufactured by Rhône-Poulenc) or the name FRD J2027 (manufactured by Borden), is used. This resin is diluted in ethanol, for example in the proportion of 25% resin and 75% ethanol, in order to adjust the viscosity. Optionally, the surface tension of the diluted resin is also adjusted by adding surfactants (a few percent by weight), so that the resin suitably wets the fibers of the fibrous reinforcements 2 and 3 and the stitching threads 5 and 6. In particular, such adjustment of the surface tension is indispensable when said fibers and threads are made of silica for example. However, if, as is the case in the abovementioned examples, these fibers and threads are based on carbon, such an addition of surfactants is in practice unnecessary since the surface tension of carbon is very low.

This diluted resin is then placed in a container that can be closed in a sealed manner and the sandwich structure 4 is immersed in the diluted resin. After the container has been sealed, the latter is placed under a vacuum of a few hundred millibars absolute (300 mb for example) for a time of approximately one hour, so as to obtain satisfactory impregnation of said fibers and threads by the diluted resin.

During this impregnation operation, the core 1 is not impregnated since it is impermeable to the resin. The impregnated resin is then cured, for example by raising the temperature, for example at 120° C. for four hours, possibly with pressure (a few bar) applied. The flexible reinforcements 2 and 3 thus become rigid skins 14 and 15, respectively, and the transverse thread portions 8 and 9 become rigid filiform spacers 16 (see FIG. 1D). These spacers 16 are strongly anchored at their ends into the rigid skins 14 and 15, by the rigid anchorings 17 and 18 that are formed by the cured bridges 10 and 11. After the impregnation resin has been fully cured, the flexible sandwich structure 4 has therefore become a rigid sandwich structure 19 in which the rigid filiform spacers 16 are orthogonal to said rigid skins 14 and 15. These spacers 16 then have a fiber content of between 30% and 90% and preferably between 30% and 50%.

To form the carbon matrix of the rigid sandwich structure 19, the latter undergoes pyrolysis at high temperature, for example 900° C., which stabilizes the geometry of this sandwich structure and removes the core 1. Optionally, this structure 19 may be densified and treated in a known manner so that its matrix becomes of the ceramic type. The composite monolith 20 of FIG. 1E, comprising two skins 21 and 22 of composite material (coming from the skins 14 and 15) spaced apart and connected to each other by a plurality of filiform spacers 23 of composite material (coming from the spacers 16), that are orthogonal to said skins 21 and 22, is then obtained.

Even after the skins 14 and 15 have been densified by known techniques, the skins 21 and 22 retain a certain porosity, which may be a problem for certain applications of the monolith 20. It is then possible to cover the external face of at least one of the skins, 21 or 22, with a coating 24, for example made of a sealing product of the gel-coat type (see FIG. 3).

Figure 4A:
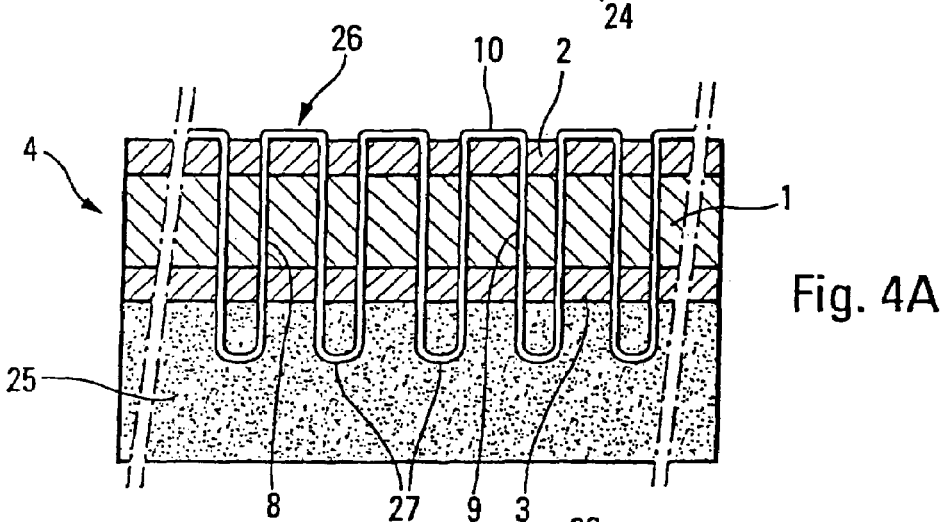
FIGS. 4A to 4C illustrate schematically three steps of an alternative method of implementing the process according to the present invention.
Figure 4B:
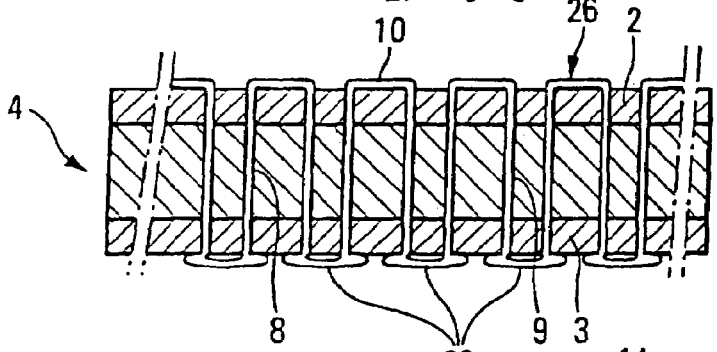
Figure 4C:
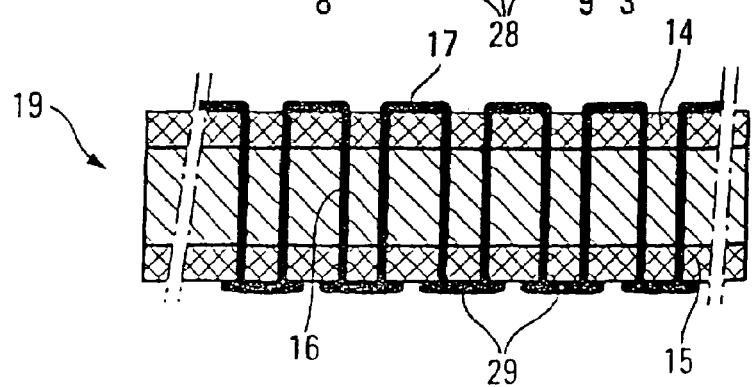

In the alternative implementation of the process according to the present invention, shown in FIGS. 4A, 4B and 4C, the flexible sandwich structure 4 is placed on a foam support 25 and assembled, by stitching without knotting, by means of a single needle thread 26, similar to the thread 5, without the use of a shuttle thread. The needle thread 26, that forms the transverse portions 8 and 9 and the bridges 10 as previously, is made to produce loops 27 in the support 25 (FIG. 4A) instead of the bridges 11.

After removal of the support 25 (FIG. 4B), the loops 27 are turned down and pressed against the flexible sandwich structure 4, forming clusters 28. After impregnation and curing of the resin (FIG. 4C), these clusters 28 become rigid heads 29 that can replace the rigid anchorings 18 of FIG. 1D.

Figure 5A:
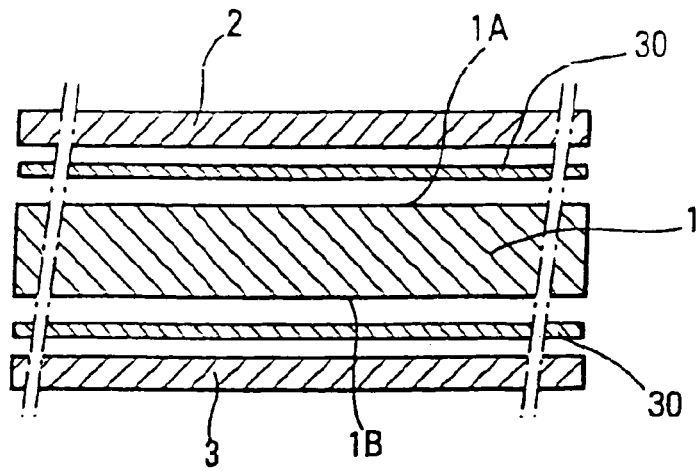
FIGS. 5A and 5B illustrate schematically another alternative implementation of the invention.
Figure 5B:
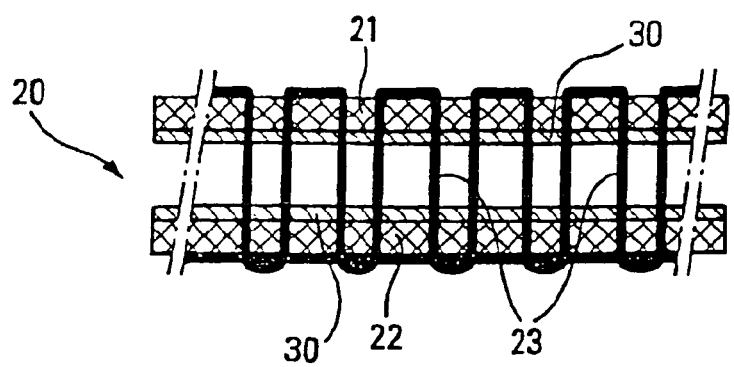

In the embodiment shown in FIGS. 5A and 5B, sheets 30, chosen for their physical and/or mechanical properties (sealing, heat reflectivity, etc), are inserted during formation of the sandwich structure 4, between the core 1 and said fibrous reinforcements 2, 3 respectively. Next, the sheets 30 are fastened to the sandwich structure 4 during assembly of the elements 1, 2 and 3 by stitching (FIG. 5A). After impregnation, curing, pyrolysis and densification, the composite monolith 20 of FIG. 5B is obtained, in which the thin sheets 30 are applied internally against said skins 21 and 22, said spacers 23 passing transversely through said thin sheets.

Figure 6A:
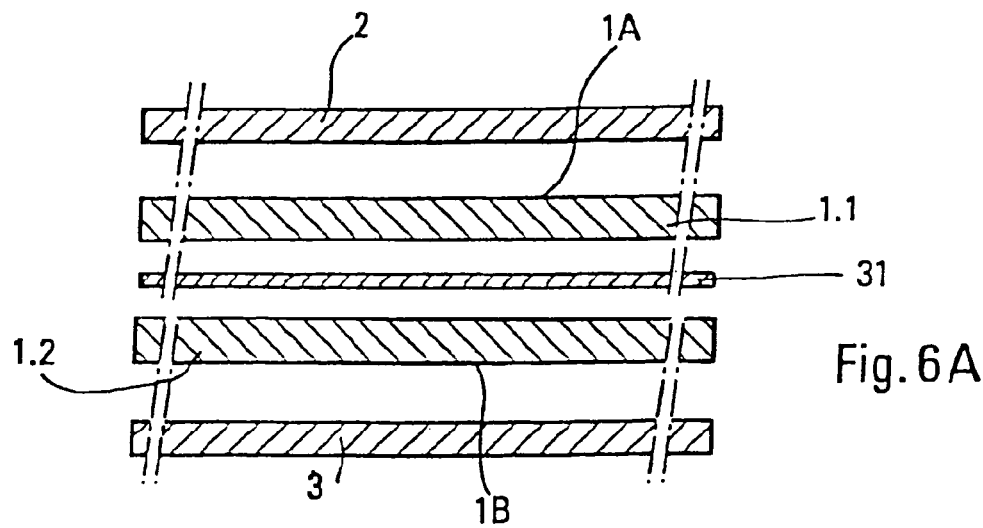
FIGS. 6A and 6B illustrate schematically yet another alterative implementation of the invention.
Figure 6B:
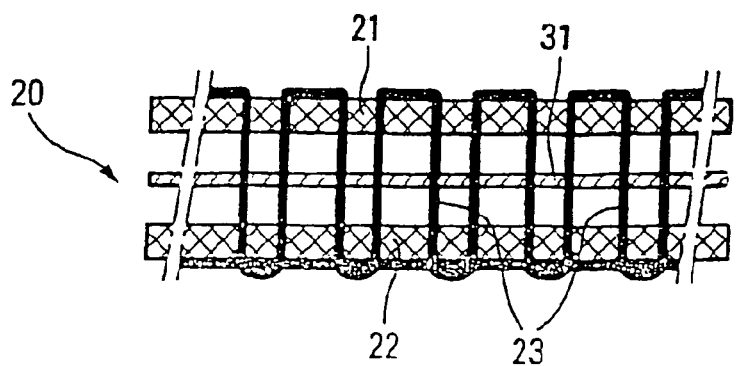

The embodiment 20 shown in FIGS. 6A and 6B includes a thin sheet 31, also chosen for its physical and/or mechanical properties, placed between the skins 21 and 22, the spacers 23 passing transversely through said thin sheet 31 and holding it in place. To obtain such a structure (see FIG. 6A), the core 1 is formed by two superposed plies 1.1 and 1.2 and said thin sheet 31 is inserted between these plies. Next, said thin sheet 31 is fastened to the assembly, while the sandwich structure 1.1, 1.2, 2 and 3 is being assembled by stitching, and then, as previously, this sandwich structure undergoes impregnation, curing, pyrolysis and densification.

Although particularly simple stitches 7 with knotting have been shown in FIGS. 1C to 1E, 3, 5B and 6B, it goes without saying that such stitches may be more complex, such as for example chain stitches.

The invention claimed is:

1. A process for producing a thermostructural fiber/matrix composite monolith comprising two skins of composite material that are spaced apart and connected to each other by a plurality of filiform spacers of composite material, said process comprising the steps of:

forming a flexible sandwich structure, comprising an intermediate flexible core, made of a material capable of being penetrated by a needle and impermeable to a resin that generates said matrix, and two external flexible fibrous reinforcements, placed on opposed external faces of said flexible core respectively;

assembling said fibrous reinforcements and said core of said sandwich structure by stitching with a roving comprising a plurality of filaments that are not linked together to form stitches that include roving portions passing transversely through said fibrous reinforcements and said core, and said roving portions passing transversely through said fibrous reinforcements and said core forming, in the latter, after stitching, longitudinal channels that are provided between said filaments and extend from one of said fibrous reinforcements to the other;

embedding said sandwich structure with said resin in a viscous state so that said resin penetrates said longitudinal channels of said transverse roving portions in order to form, at the position of each of them, a resin bridge in contact via its opposed ends with the resin that impregnates said flexible fibrous reinforcements;

curing said resin embedding said sandwich structure; and removing said core.

2. The process as claimed in claim 1, characterized in that said core is made from a foam of a synthetic material having a specific gravity of between 0.04 and 0.1.

3. The process as claimed in claim 2, characterized in that said specific gravity is between 0.05 and 0.07.

4. The process as claimed in claim 2, characterized in that said synthetic material is a polystyrene.

5. The process as claimed in claim 1, characterized in that, after impregnation and curing of said sandwich structure, each of the filiform spacers resulting from the impregnation and from the curing of one of said transverse roving portions has a fiber content of between 30% and 90%.

6. The process as claimed in claim 5, characterized in that said fiber content is between 30% and 50%.

7. The process as claimed in claim 1, characterized in that said assembly is obtained by stitching with knotting in such a way that the ends of said transverse roving portions are anchored into said fibrous reinforcements by bridges that connect two such consecutive portions.

8. The process as claimed in claim 1, characterized in that said assembly is obtained by stitching without knotting, with formation, on one side of said sandwich structure, of projecting loops in such a way that, on this side, the anchoring of the ends of the transverse roving portions into the corresponding reinforcement results from the flattening of said loops whereas, on the other side of said sandwich structure, the ends of the transverse roving portions are anchored into the corresponding fibrous reinforcement by bridges that connect two consecutive portions.

9. The process as claimed in claim 1, characterized in that, after said resin curing operation, the temperature of said sandwich structure is raised so as to pyrolyze said resin and to remove said core.

10. The process as claimed in claim 1, characterized in that, during formation of the flexible sandwich structure, at least one thin sheet is inserted between said intermediate flexible core and at least one of said fibrous reinforcements and in that said thin sheet is fastened to said fibrous reinforcements and to said core while the latter elements are being assembled by stitching.

11. The process as claimed in claim 1, characterized in that said intermediate flexible core is formed by at least two superposed plies, in that at least one thin sheet is interposed between said superposed plies and in that said thin sheet is fastened to said fibrous reinforcements and to said superposed plies of said core while the latter elements are being assembled by stitching.

12. A fiber/matrix composite monolith comprising two skins of composite material that are spaced apart and connected to each other by a plurality of filiform spacers of composite material, said monolith being obtained by implementing the process as claimed in claim 1.

13. The monolith as claimed in claim 12, characterized in that said skins are at least substantially parallel and in that said spacers are at least substantially orthogonal to said skins.

14. The monolith as claimed in claim 12, characterized in that a coating is applied externally to at least one of said skins.

15. The monolith as claimed in claim 12, characterized in that it includes at least one thin sheet applied internally to at least one of said skins, said spacers passing transversely through said thin sheet.

16. The monolith as claimed in claim 12, characterized in that it includes at least one thin sheet placed between said skins, said spacers passing transversely through said thin sheet.

* * * * *